United States Patent Office 2,942,901
Patented June 28, 1960

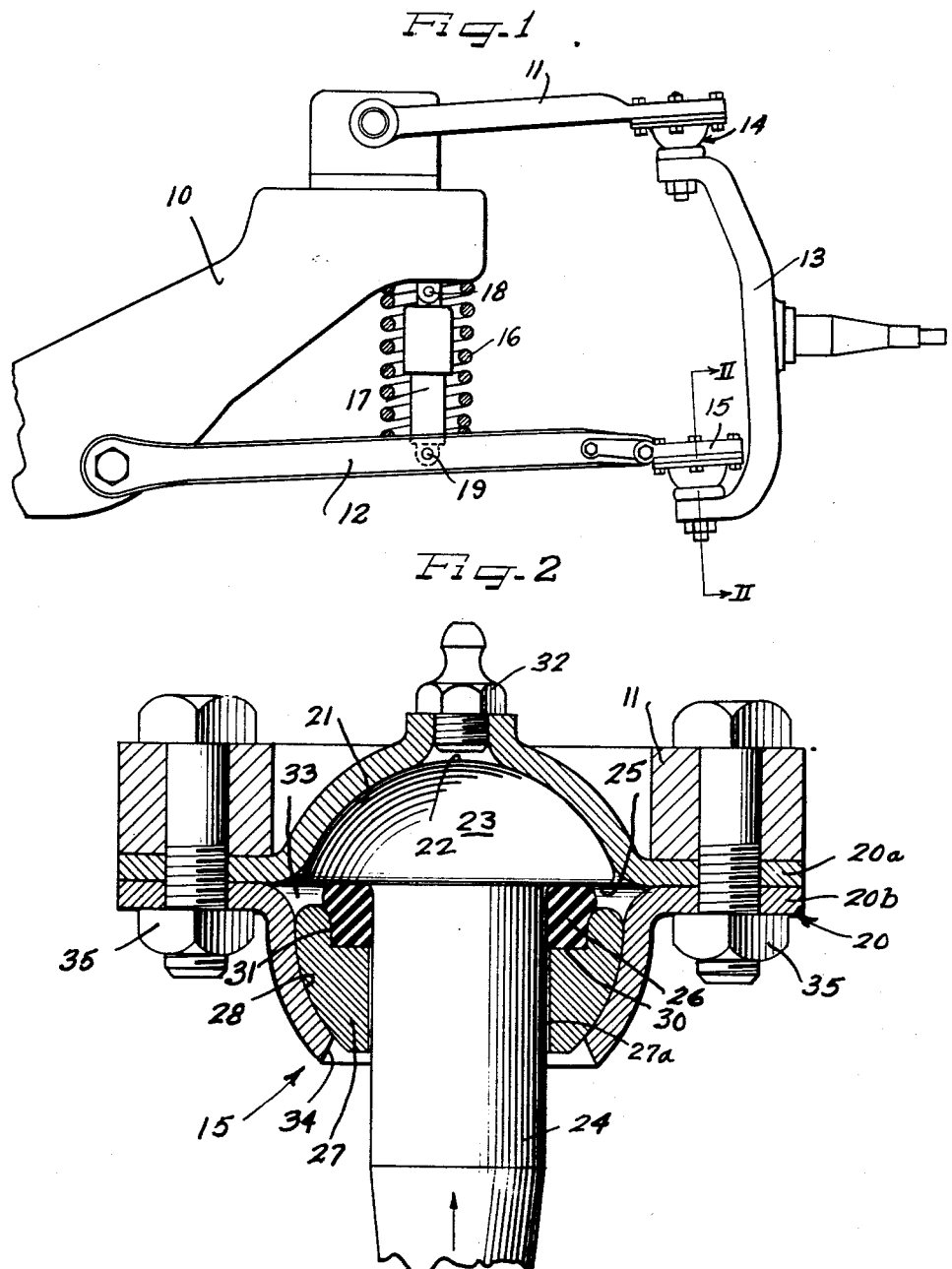

2,942,901

PRE-LOADED BALL JOINT

James H. Booth, Detroit, Mich., assignor to Thompson Ramo Wooldridge Inc., a corporation of Ohio Filed Dec. 5, 1955, Ser. No. 551,006

3 Claims. (Cl. 287—90)

The present invention relates to universal joint construction and is, more particularly, concerned with the provision of the simplified and substantially improved limited-angularity compression loaded ball joint for use in vehicle steering systems or the like.

As those skilled in the art are aware, the important advantages of automatic self-alignment and wear take up offered by ball joints have caused such joints to replace the formerly universally used king pin type wheel support bearing. Initially, the use of such ball joint pivot bearings was confined to the more expensive vehicles and numerous attempts have been made to provide the advantages of ball joint wheel support bearings at less cost. One of the major difficulties in the cost battle has been the need for relatively low frictional drag under heavy loads. Such drag, may, of course, be eliminated through utilization of ball or roller bearings but these substantially raise the cost of the joints. In the past, ball joints constructed without such anti-friction bearings have had relatively limited utility under heavy loads since it has been extremely difficult to maintain a pressurized lubricant film between cooperating metal surfaces.

The present invention has provided a very inexpensive joint capable of carrying heavy loads in compression without, at the same time, necessitating the use of anti-friction roller bearings. In accordance with the principles of the present invention, a closed sheet metal stamped housing is provided having a segmental-spherical cup surface for bearing contact with a cooperating segmental-spherical enlarged ball stud head. These cooperating surfaces are subjected to the full load carried by the joint. A reduced diameter neck is provided on the stud and passes through an aperture in the sheet metal housing directly opposite from the segmental-spherical load carrying wall. Immediately adjacent the opening, the housing is provided with a second, annular segmental-spherical surface which cooperates with another segmental-spherical, annular, relatively loosely fitting bearing surface on a ring carried on the neck of the stud. A resilient seal and spring is positioned between the annular ring and the enlarged head of the ball stud and serves to maintain the ring in bearing and sealing relation with the housing. Grease, or other suitable lubricant is injected into the housing at a point approximately at the center of the load carrying bearing surfaces and is maintained at all times between the bearing surfaces, under pressure, as a result of the effective seal provided between the stud neck and the housing.

It is, accordingly, an object of the present invention to provide a simplified ball joint capable of carrying heavy loads for extended periods of time.

Still a further object of the present invention is to provide a limited-angle compression loaded ball joint capable of construction at an absolute minimum of cost.

A feature of the present invention resides in the provision of a compact highly pressurized joint seal which permits retention of lubricants between smooth bearing surfaces of the joint.

Another feature of the invention is the provision of a semi-resilient plastic bearing ring acting in combined sealing and bearing relationship with metal under the application of a resilient sealing spring element.

Yet a further object of the present invention is to provide a ball joint capable of carrying heavy loads in compression for extended periods of time without the need for anti-friction roller bearings or the like.

Many other and further objects and features of the present invention will at once become apparent to those skilled in the art from the consideration of the attached drawings wherein a preferred form of the invention is shown by way of illustration only, and wherein;

Figure 1 is a diagrammatic view of a vehicle suspension incorporating a joint constructed in accordance with the principles of the present invention; and Figure 2 is an enlarged cross sectional view in elevation of a joint constructed in accordance with the principles of the present invention and taken along the line II—II of Figure 1.

As shown on the drawings:

As may be seen from consideration of Figure 1, the joint of the present invention may be used as a component of an independent front wheel vehicle suspension. As illustrated, a vehicle frame cross member 10 pivotally supports upper and lower wheel control arms 11 and 12 respectively. The control arms 11 and 12 in turn support a steering knuckle 13 by means of upper and lower ball joint connections 14 and 15 respectively. In the form of the suspension shown, the vehicle load is carried by the lower control arm 12 through a helical spring 16 extending between the frame 10 and lower control arm 12 and surrounding a conventional direct acting shock absorber 17 pivoted to the frame at 18 and to the lower control arm 12 at 19. As the arrangement is shown, the lower ball joint 15 carries essentially the entire vehicle load and the upper joint 14 operates mainly to control the steering friction in the system in the manner illustrated in connection with the upper ball joint in my earlier Patent No. 2,521,335. This upper joint forms no part of the present invention.

The lower ball joint 15 comprises, as may be seen from a consideration of Figure 2, a housing 20 formed of a pair of stamped sheet metal members 20a and 20b. The upper portion 20a is provided with an internally facing segmental-spherical bearing surface 21 which cooperates with an externally facing segmental-spherical bearing surface 22 on the head 23 of ball stud 24. The stud head 23 is provided with a flat annular supporting surface 25 which cooperates with a resilient annular member 26 to force the segmental-spherical annular bearing ring 27 into firm bearing and sealing engagement with the segmental-spherical bearing surface 28 on the housing member 20b.

In its preferred form, the housing portions 20a and 20b, as well as the stud 24 are constructed of steel. The annular bearing ring 27 is preferably constructed of a semi-resilient plastic of the self lubricating type such as high molecular weight polyamide or polyethylene. The annular member 26 positioned between the stud head 23 and the ring 27 is preferably constructed of a resilient though incompressible substance such as synthetic rubber which is not subject to deterioration as a result of contact with conventional joint lubricants. As may be noted, the ring 27 is provided with an annular recess 30 having a generally cylindrical retaining wall surface 31 which confines the outer edge of the annular rubber member 26. The rubber member 26 is constructed to substantially more than fill the recess 30 and substantially pre-loads the bearing surfaces when the housing portions 20a and 20b are clamped into assembled position.

The grease fitting 32 of the pressure type is provided for inserting lubricant to the bearing surfaces 21 and 22. Upon the application of lubricant under pressure, the lubricant fills the reservoir 33 and operates in conjunction with the resilient member 26 to maintain the annular bearing ring 27 in snug engagement with the bearing surface 28. It has been found that the semi-resilient nature of the bearing ring 27, as well as its self-lubricating nature, provides an effective seal as well as bearing surface between the ring 27 and the housing portion 20b, when preloaded by the member 26. As a result, lubricant injected under pressure at the fitting 32 is maintained under a positive pressure in the joint, thereby maintaining at all times a film of lubricant between the bearing surfaces 21 and 22. Thus, in spite of the application of heavy loads to the joint 15, and the use of the less expensive large manufacturing tolerances between the stud 24 and bearing ring 27, as at 27a, lubricant is at all time applied to the load carrying bearing surfaces in sufficient quantity to prevent scoring and permit easy steering. Additionally, in view of the use of the resilient element 26, no grinding or other expensive machinery is necessary at the surface 25 of the stud 24, or at the junction of that surface and the stud shank, thereby materially reducing the cost of manufacture.

It will thus be seen that I have provided a novel and substantially improved joint utilizing a minimum number of parts interrelated in an effective manner to provide an inexpensive, high performance, bearing joint. It will be obvious, of course, that variations may be made in accordance with the principles of the present invention without departing from the scope of the novel concepts thereof. For example, the bearing surface 22 on the stud head 23 may be provided with spiral lubricant grooves for assuring a flow of lubricant over the bearing surfaces 21 and 22. Likewise, the edge 34 of the housing portion 20b may be smaller or larger in diameter than shown in order to permit a variation in permissible angular movement of the joint. While the joint housing portions 20a and 20b have been illustrated as maintained in their assembled position by a conventional bolt or fastening 35, it will be understood that the housing portions 20a and 20b may be welded together to form a sub-assembly before installation thus facilitating shipment of parts for service in the field.

In view of the manifold nature of the variations which can be incorporated in accordance with the principles of the present invention, it is my intention that the scope of the present invention be limited solely by that of the hereinafter appended claims.

I claim as my invention:

1. A pre-loaded joint comprising a housing having a first concave segmental-spherical bearing surface and a second apertured segmental-spherical bearing surface opposite thereto, a stud having an enlarged head with a segmental-spherical bearing surface for cooperation with said first bearing surface and a reduced diameter shank passing through the aperture of said housing, an annular bearing ring rotatably mounted on said shank and having a segmental-spherical bearing surface for cooperation with said second bearing surface, a supporting surface on said head facing said bearing ring, and an annular elastomeric readily deformable loading member positioned between said supporting surface and said ring and simultaneously pre-loading said bearing surfaces into engagement and expanding radially inwardly into sealing engagement around said stud shank to seal the space between said ring and said shank when said head and ring are assembled in clamped relation within said housing.

2. A compression loaded, pre-loaded ball joint comprising a housing member having a first load carrying concave segmental-spherical bearing surface and a second apertured segmental-spherical bearing surface opposite thereto, a stud having an enlarged head with a load carrying segmental-spherical bearing surface for cooperation with said first bearing surface and a reduced diameter shank passing through the aperture of said housing, an annular bearing ring rotatably mounted on said shank and having a segmental-spherical bearing surface of plastic material for cooperation with said second bearing surface, and an annular substantially incompressible resilient readily deformable elastomeric loading member positioned between said enlarged head and said ring and simultaneously pre-loading said bearing surfaces into engagement and expanding radially inwardly into sealing engagement around said stud shank to seal the space between said ring and said shank when said head and ring are assembled in clamped relation within said housing.

3. A pre-loaded joint comprising a housing having a first concave segmental spherical bearing surface and a second apertured segmental spherical bearing surface opposite thereto, a stud having an enlarged head with a segmental spherical bearing surface for co-operation with said first bearing surface and a reduced diameter shank passing through the aperture of said housing, an annular bearing ring rotatably mounted on said shank and having a segmental spherical bearing surface for cooperation with said second bearing surface, a supporting surface on said head facing said bearing ring and an annular resilient readily deformable elastomeric loading member positioned between said supporting surface and said ring, and annular confining means restricting outward expansion of the said loading member whereby said loading member simultaneously pre-loads said bearing surfaces into engagement and expands radially inwardly into sealing engagement around said stud shank to seal the space between said ring and said shank when said head and ring are clamped in assembled relation in said housing.

References Cited in the file of this patent

UNITED STATES PATENTS

| | | |
|---|---|---|
| 1,482,756 | Liebowitz | Feb. 5, 1924 |
| 1,806,286 | Flumerfelt | May 19, 1931 |
| 2,124,034 | Hufferd | July 19, 1938 |
| 2,305,815 | Schwarz | Dec. 22, 1942 |
| 2,544,583 | Booth | Mar. 6, 1951 |
| 2,727,768 | Latzen | Dec. 20, 1955 |
| 2,761,695 | Graham | Sept. 4, 1956 |
| 2,846,252 | Herbenar et al. | Aug. 5, 1958 |